United States Patent [19]

Adachi

[11] Patent Number: 4,950,146
[45] Date of Patent: Aug. 21, 1990

[54] MOTOR CONTROL DEVICE FOR ELECTRIC INJECTION MOLDING MACHINE

[75] Inventor: Taira Adachi, Sakura, Japan

[73] Assignee: Sumitomo Heavy Industries, Ltd., Tokyo, Japan

[21] Appl. No.: 377,976

[22] Filed: Jul. 11, 1989

[30] Foreign Application Priority Data

Jul. 13, 1988 [JP] Japan .................. 63-172570

[51] Int. Cl.$^5$ .............................. B29C 45/77
[52] U.S. Cl. .................. 425/149; 264/40.3; 425/170; 425/589
[58] Field of Search ............... 264/40.3, 40.7; 425/145, 149, 170, 589

[56] References Cited

U.S. PATENT DOCUMENTS

| 4,540,359 | 9/1985 | Yamazaki | 425/157 |
| 4,579,515 | 4/1986 | Kamaguchi et al. | 425/149 |
| 4,758,391 | 7/1988 | Shimizu et al. | 425/145 |

FOREIGN PATENT DOCUMENTS

| 230488 | 8/1987 | . | |
| 247208 | 12/1987 | . | |
| 24423 | 2/1986 | Japan | . |
| 61-24423 | 2/1986 | Japan | . |
| 61-31221 | 2/1986 | Japan | . |
| 64-27921 | 1/1989 | Japan | . |

Primary Examiner—Jay H. Woo
Assistant Examiner—Timothy W. Heitbrink
Attorney, Agent, or Firm—Armstrong, Nikaido, Marmelstein, Kubovcik & Murray

[57] ABSTRACT

A motor control device for an electric injection molding machine. The injection molding machine has a screw rotating mechanism including a rotary shaft associated with one end of a resin feeding screw received in a heating cylinder, a holding member rotatably holding said rotary shaft and slidable in the axial direction of said rotary shaft, and a first motor for driving said screw through said rotary shaft. The injection molding machine also includes a second motor for producing a force for advancing said screw in the injecting direction and retracting said screw, a screw shaft and a nut for converting the output torque of said second motor into linear movement, and a sliding member to which said nut is fixed. The motor control device includes a load detecting member fixed at one end to said holding member and at the other end to said sliding member, and a controller for controlling the operation of the first and second motors in accordance with the level of load detected by the load detecting member.

2 Claims, 1 Drawing Sheet

MOTOR CONTROL DEVICE FOR ELECTRIC INJECTION MOLDING MACHINE

BACKGROUND OF THE INVENTION

1. Field of the Invention

The present invention relates to a motor control device for an electric injection molding machine.

2. Description of the Prior Art

Injection molding machines are known to have an injection unit which operates fully hydraulically or by a hydraulic-electric driving system. Nowadays, injection units have become available which are driven fully electrically. Examples of such electric injection units are shown, for example, in Japanese Patent Unexamined Publication Nos. 61-24423 and 61-31221.

In the electric injection unit disclosed in Japanese Patent Unexamined Publication No. 61-24423, the resin pressure in the injection cylinder is controlled on the basis of the pressure value which is calculated from electric current and voltage of the electrical power supplied to a driving motor. The calculated resin pressure, however, largely differs from the actual resin pressure because the driving power calculated from the current and voltage does not correctly reflect the actual pressure due to an energy loss in the transmission system including a nut and a screw shaft between the electric motor and the plasticizing screw.

The difference between the calculated resin pressure and the actual resin pressure is increased particularly when the screw is being accelerated or decelerated because the current and the voltage have been changed due to inertia of the motor and the transmission system.

The injection unit disclosed in Japanese Patent Unexamined Publication No. 61-31221 is designed to directly detect the resin pressure, so that no substantial influence is caused by acceleration and deceleration of the screw. However, a considerably large error is caused also in this case due to presence of the nut and screw shaft between the pressure detector and the plasticizing screw.

SUMMARY OF THE INVENTION

Accordingly, an object of the present invention is to provide a motor control device for an electric injection molding machine which is capable of detecting the resin pressure with a high degree of precision so as to enable precise control of the injection pressure and the back pressure.

To this end, according to the present invention, there is provided a motor control device for an electric injection molding machine comprising: screw rotating means including a rotary shaft associated with one end of a screw received in a heating cylinder, a holding member rotatably holding the rotary shaft and slidable in the axial direction of the rotary shaft, and a first motor for driving the screw through the rotary shaft; screw advancing/retracting means including a second motor for producing a force for advancing the screw in the injecting direction and retracting the screw, a screw shaft and a nut for converting the output torque of the second motor into a linear movement, and a sliding member to which the nut is fixed; and a load detecting member provided between the screw rotating means and the screw advancing/retracting means, the load detecting member being fixed at its one end to the holding member and at its other end to the sliding member.

The value of the load detected by the load detection member is fed back to the first motor and/or the second motor so that the injection pressure and the back pressure on the injection screw are controlled.

DESCRIPTION OF THE PREFERRED EMBODIMENTS

A preferred embodiment of the present invention will be described with reference to the accompanying drawings.

Figure 1:
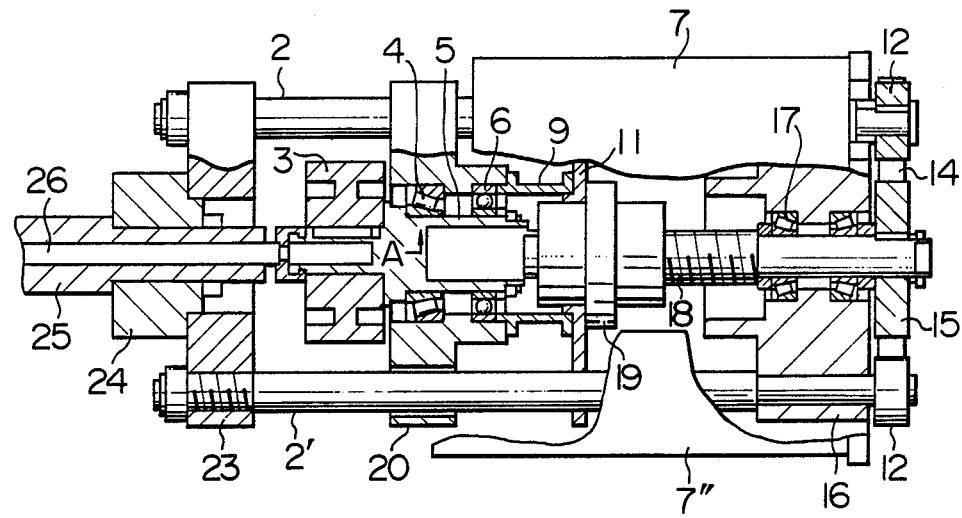
FIG. 1 is a sectional view of an embodiment of the present invention.
Figure 2:
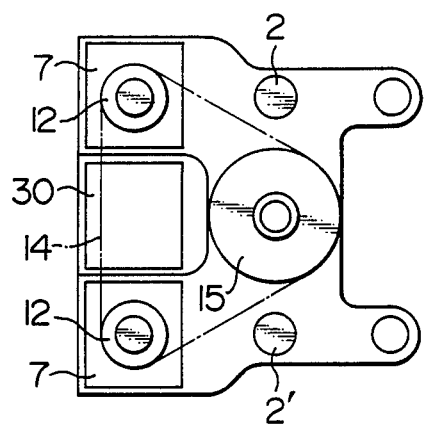
FIG. 2 is a side elevational view of the embodiment shown in FIG. 1.
Figure 3:
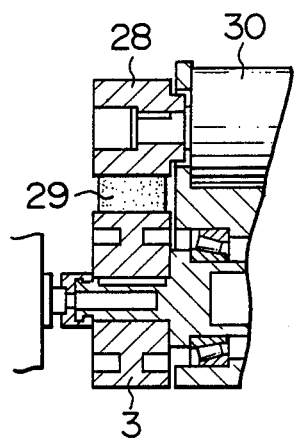
FIG. 3 is a fragmentary sectional view of the embodiment shown in FIG. 1.

Referring to FIGS. 1 and 2, an injection molding machine has a heating cylinder 25 which receives a screw 26 rotatably and axially movably. The heating cylinder is surrounded by a water-cooling jacket 24 which is held by a front plate 23. A rotary shaft 5 is splined at one end to one end of the screw 26. The rotary shaft 5 is rotatably supported on a pressure plate (holding member) 20 through bearings 4 and 6 but is prevented from moving axially. A load cell 9, serving as the load detecting member used in the device of the invention, is fixed at a first flange to one end of the pressure plate 20. The other end of the load cell 9 is fixed to a plate (sliding member) 11 by means of another flange. The plate 11 is fixed to a nut 19 which is screwed to a screw shaft 18 extending in the axial direction. The screw shaft 18 is rotatably supported by a rear plate 16 through bearings 17. The aforementioned front plate 23 and the rear plate 16 support guide rods 2 and 2' along which the pressure plate 20 and the plate 11 slide in the axial direction, i.e., in the injecting direction.

The screw shaft 18 carries at its rear end a pulley 15 which is drivingly connected through a belt 14 to a pulley 12 which is fixed to the rotor shaft of a second motor 7 which is capable of causing the injecting action.

On the other hand, a pulley 3 secured to the rotary shaft 5 is drivingly connected, through a belt 29, to a pulley 28 secured to the rotor shaft of the first motor 30 which is used for rotationally driving the screw 26. The output of the load cell 9 is input to a motor controller (not shown) which is capable of controlling the second motor 7 and/or the first motor 30 in a manner which will be explained later.

In operation, as the first motor 30 is started, the screw 26 is rotationally driven so that the resin material introduced into the heating cylinder 25 is molten and kneaded in the heating cylinder 25 so as to be displaced to and stored at the end of the screw 26. In consequence, the screw 26 is forced to move backward by the pressure of the molten resin accumulated at the end of the screw 26. The pressing force applied to the screw 26 is transmitted to the load cell 9 through the rotary shaft 5 and the pressure plate 20. The controller detects the backward force acting on the screw 26, i.e., the back pressure, from the amount of strain of the load cell 9, and feeds the detected value of the back pressure to the controller which controls the second motor 7 such that the detected back pressure becomes equal to a predetermined pressure. In consequence, the screw 26 is moved backward while rotating, and the metering process is finished when the screw 26 has been moved backward to a predetermined position.

Then, the first motor 30 for driving the screw is stopped and the second motor 7 for injection is started. In consequence, the screw shaft 18 is rotated to cause the nut 19 and, hence, the plate (sliding member) 11 to move to the left as viewed in the drawings, i.e., in the injecting direction. In consequence, the rotary shaft 5 is moved to the left together with the pressure plate 20 so that the screw 26 is moved forward, i.e., in the injecting direction, so that the molten resin is injected into a die which is not shown. The injection pressure sustained by the molten resin is transmitted to the load cell through the pressure plate 20 and the rotary shaft 5. The injection pressure is detected from the amount of strain of the load cell 9 and the value of the injection pressure thus detected is fed back to the controller. The controller then performs a control of the rotation of the second motor 7 in such a manner as to make the injection pressure coincide with a predetermined injection pressure.

In the above-described embodiment, the rotational reactional force exerted on the nut 19 is borne by the plate 11 so as not to be transmitted to the pressure plate 20, whereby the detection precision can be improved.

As has been described, according to the invention, the rotational reactional force is not borne by the parts acting between the load detecting member 9 and the screw 26, so that only a small error incurred by a slight friction is involved in the detection of the pressures, whereby the actual resin pressure can be detected with a high degree of precision. It is therefore possible to control the back pressure and the injection pressure with extremely high degrees of precision.

Although the invention has been described through its preferred form, it is to be understood that the described embodiment is only illustrative and various changes and modifications may be imparted thereto without departing from the scope of the present invention which is limited solely by the appended claims.

What is claimed is:

1. A motor control device for an electric injection molding machine comprising:
   rotating means for rotating a resin feeding screw including a rotary shaft associated with one end of a screw received in a heating cylinder, a holding member rotatably holding said rotary shaft and slidable in an axial direction of said direction of said rotary shaft, and a first motor for driving said screw through said rotary shaft;
   screw advancing/retracting means including a second motor for producing a force for advancing said screw in an injection direction and retracting said screw, a screw shaft and a nut for converting output torque of said second motor into linear movement, and a sliding member to which said nut is fixed; and
   a load detecting member provided between said screw rotating means and said screw advancing/retracting means, said load detecting member being fixed at one end to said holding member and at a second end to said sliding member.

2. A motor control device according to claim 1, further comprising a controller to which a load detected by said load detecting member is fed back and which is capable of controlling said first and/or second motors so as to control the injection pressure produced by said screw and back pressure applied to said screw.

* * * * *